United States Patent
Peterson et al.

(10) Patent No.: US 8,487,473 B2
(45) Date of Patent: Jul. 16, 2013

(54) HIERARCHICAL POWER SMOOTHING

(75) Inventors: Eric C. Peterson, Woodinville, WA (US); Shaun L. Harris, Sammamish, WA (US); Christian L. Belady, Mercer Island, WA (US); Frank J. Wirtz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 233 days.

(21) Appl. No.: 12/822,949

(22) Filed: Jun. 24, 2010

(65) Prior Publication Data

US 2011/0316338 A1    Dec. 29, 2011

(51) Int. Cl.
*H02J 1/10* (2006.01)
*H02J 3/00* (2006.01)
*H02J 3/14* (2006.01)

(52) U.S. Cl.
USPC ............. 307/29; 323/268; 323/272; 323/282; 323/284; 307/18; 307/64; 307/80; 307/147; 307/150

(58) Field of Classification Search
USPC ................................................ 307/29, 64, 65
See application file for complete search history.

(56) References Cited

U.S. PATENT DOCUMENTS

| | | |
|---|---|---|
| 2,798,898 A | 7/1957 | Popovich |
| 3,187,086 A | 6/1965 | Moodie |
| 3,346,687 A | 10/1967 | Giger et al. |
| 4,849,581 A | 7/1989 | Larkin et al. |
| 5,214,314 A | 5/1993 | Dillard et al. |
| 5,466,889 A | 11/1995 | Faulkner et al. |
| 5,486,651 A | 1/1996 | Morgan |
| 5,694,312 A | 12/1997 | Brand et al. |
| 5,760,339 A | 6/1998 | Faulkner et al. |
| 5,918,641 A | 7/1999 | Hardy et al. |
| 5,969,938 A | 10/1999 | Byrne et al. |
| 6,040,976 A | 3/2000 | Bruner et al. |
| 6,184,594 B1 | 2/2001 | Kushnarenko |
| 6,381,122 B2 | 4/2002 | Wagener |
| 6,392,141 B1 | 5/2002 | Smith et al. |
| 6,754,066 B2 | 6/2004 | Doan et al. |
| 6,786,749 B2 | 9/2004 | Meiners et al. |
| 6,836,098 B1 | 12/2004 | O'Brien |
| 6,856,047 B2 | 2/2005 | Murabayashi et al. |

(Continued)

OTHER PUBLICATIONS

"PCT Search Report and Written Opinion", Application No. PCT/US2011/037076, (Dec. 26, 2011),8 pages.

(Continued)

*Primary Examiner* — Rexford N Barnie
*Assistant Examiner* — Toan Vu
(74) *Attorney, Agent, or Firm* — Wolfe-SBMC

(57) ABSTRACT

Power is provided to one or more devices in a system that includes a hierarchical power smoothing environment having multiple tiers. In response to a peak in power usage by the one or more devices, power is provided from a first power smoothing component in a first tier of the multiple tiers. Additionally, power is provided to the one or more devices from power smoothing components in each of other tiers of the multiple tiers if the power smoothing component in a next lower tier of the multiple tiers is unable to provide sufficient power for the peak in power usage. If the power smoothing components in the multiple tiers are unable to provide sufficient power for the peak in power usage, then performance of at least one of the one or more devices is reduced in response to the peak in power usage.

20 Claims, 5 Drawing Sheets

U.S. PATENT DOCUMENTS

| | | | |
|---|---|---|---|
| 6,934,147 B2 | 8/2005 | Miller et al. | |
| 7,173,811 B2 | 2/2007 | Abrahamsen et al. | |
| 7,173,821 B2 | 2/2007 | Coglitore | |
| 7,210,048 B2* | 4/2007 | Bodas | 713/320 |
| 7,254,742 B2 | 8/2007 | Hayashi | |
| 7,271,506 B1 | 9/2007 | Bersiek | |
| 7,296,172 B2 | 11/2007 | Hsu et al. | |
| 7,339,786 B2 | 3/2008 | Bottom et al. | |
| 7,379,305 B2 | 5/2008 | Briggs et al. | |
| 7,395,444 B2 | 7/2008 | Ives | |
| 7,425,682 B2 | 9/2008 | Rasmussen et al. | |
| 7,440,260 B2 | 10/2008 | Parker et al. | |
| 7,450,368 B2 | 11/2008 | Parker et al. | |
| 7,495,415 B2 | 2/2009 | Kanouda et al. | |
| 7,509,506 B2 | 3/2009 | Bahali et al. | |
| 7,514,815 B2* | 4/2009 | Paik et al. | 307/64 |
| 7,519,909 B2 | 4/2009 | Kuiawa et al. | |
| 7,533,283 B2 | 5/2009 | Fung | |
| 7,542,268 B2 | 6/2009 | Johnson, Jr. | |
| 7,560,831 B2 | 7/2009 | Whitted et al. | |
| 7,561,411 B2 | 7/2009 | Johnson, Jr. | |
| 7,718,889 B2 | 5/2010 | Rasmussen et al. | |
| 7,760,516 B2 | 7/2010 | Johnson, Jr. et al. | |
| 7,782,596 B2 | 8/2010 | Ross | |
| 7,791,894 B2 | 9/2010 | Bechtolsheim | |
| 7,857,214 B2 | 12/2010 | Saliaris | |
| 8,080,900 B2 | 12/2011 | Corhodzic et al. | |
| 8,384,244 B2 | 2/2013 | Peterson et al. | |
| 2001/0003207 A1 | 6/2001 | Kling et al. | |
| 2003/0052543 A1 | 3/2003 | Boost | |
| 2003/0109965 A1 | 6/2003 | Gee | |
| 2004/0000815 A1 | 1/2004 | Pereira | |
| 2004/0163001 A1 | 8/2004 | Bodas | |
| 2004/0229621 A1 | 11/2004 | Misra | |
| 2004/0231875 A1 | 11/2004 | Rasmussen et al. | |
| 2005/0052805 A1 | 3/2005 | Sato et al. | |
| 2005/0258922 A1 | 11/2005 | Rowe et al. | |
| 2006/0002056 A1 | 1/2006 | Abrahamsen et al. | |
| 2006/0151190 A1 | 7/2006 | Rasmussen et al. | |
| 2006/0248325 A1 | 11/2006 | Fung | |
| 2006/0267409 A1 | 11/2006 | Mullet et al. | |
| 2007/0037455 A1 | 2/2007 | Cabrera et al. | |
| 2007/0168088 A1 | 7/2007 | Ewing et al. | |
| 2007/0187343 A1 | 8/2007 | Colucci et al. | |
| 2007/0217125 A1 | 9/2007 | Johnson | |
| 2007/0217178 A1 | 9/2007 | Johnson et al. | |
| 2007/0278860 A1 | 12/2007 | Krieger et al. | |
| 2008/0197706 A1 | 8/2008 | Nielsen | |
| 2008/0245083 A1 | 10/2008 | Tutunoglu et al. | |
| 2008/0268331 A1 | 10/2008 | Douglas | |
| 2009/0021078 A1 | 1/2009 | Corhodzic et al. | |
| 2009/0034166 A1 | 2/2009 | Rasmussen et al. | |
| 2009/0034167 A1 | 2/2009 | Rasmussen et al. | |
| 2009/0073641 A1 | 3/2009 | Ross | |
| 2009/0112522 A1 | 4/2009 | Rasmussen | |
| 2009/0195075 A1 | 8/2009 | Ziegler et al. | |
| 2009/0223240 A1 | 9/2009 | Bean | |
| 2009/0309570 A1 | 12/2009 | Lehmann et al. | |
| 2010/0020475 A1 | 1/2010 | Spitaels et al. | |
| 2010/0275441 A1 | 11/2010 | Rasmussen et al. | |
| 2011/0296225 A1 | 12/2011 | Belady | |
| 2011/0304211 A1* | 12/2011 | Peterson et al. | 307/48 |
| 2012/0079321 A1 | 3/2012 | Williams | |
| 2012/0098343 A1 | 4/2012 | Harris | |

OTHER PUBLICATIONS

"PCT Search Report and Written Opinion", Application No. PCT/US2011/037627, (Feb. 9, 2012),10 pages.

"HP R3000v UPS Uninterruptible Power System (UPS)", Retrieved from: <http://h18000.www1.hp.com/products/quickspecs/13129_div/13129_div.HTML> on Sep. 13, 2010, (Mar. 12, 2009),5 pages.

"International Search Report", Mailed Date: Dec. 20, 2011, Application No. PCT/US2011/041022, Filed Date: Jun. 20, 2011, pp. 9.

"Non-Final Office Action", U.S. Appl. No. 12/797,497, (May 10, 2012),21 pages.

"MopUPS", Retrieved from: <http://www.chloridepower.com/en/USA/Monitoring-Tools/Software-for-UPS-monitoring-and-computer-shutdown/> on Feb. 25, 2010, (Feb. 24, 2010),2 pages.

"PowerVision® UPS Power Management Software for Enterprises", *Powerware*, Available at <http://www.computerenvironmental.com/software/Powervision.pdf>,(Jun. 2003),6 pages.

"SmartPro Rack/Tower UPS", Retrieved from: <http://www.upsgalaxy.com/pdf/1514.pdf> on Feb. 24, 2010, Tripp Lite,(Feb. 24, 2010),5 pages.

"The High-end UPS for Top Security", *Online USV Syteme AG*, Available at <http://www.online-usv.de/downloads/db_xrt_en_2009-10-28.pdf>,(Feb. 24, 2010),6 pages.

"Ups Monitoring Software: Cut Down the Burden of Manual Ups Handling", Retrieved from: <http://www.articlesbase.com/software-articles/ups-monitoring-software-cut-down-the-burden-of-manual-ups-handling-716430.html> on Feb. 25, 2010, (Jan. 9, 2009), 1 page.

Felter, Wes et al., "A Performance-Conserving Approach for Reducing Peak Power Consumption in Server Systems", *In Proceedings of ICS' 05*, (Jun. 2005),10 pages.

Kian "Monitoring UPS Power Status Using Network UPS Tools (NUT) 2.2.0 on Multiple OpenSuSE 10.3 Servers", Retrieved from: <http://www.howtoforge.com/monitoring-ups-power-status-with-nut-on-opensuse10.3> on Feb. 25, 2010, (Apr. 14, 2008),14 pages.

Noer, Geoffrey., "Power and Cooling in a Containerised Data Center", Retrieved at << http://www.datacenterdynamics.com/ME2/dirmod.asp?sid=&nm=&type=Publishing&mod=Publications::Article&mid=8F3A7027421841978F18BE895F87F791&tier=4&id=818B9E52878348FBA2CF87C3E00FAD54 >>, Jun. 25, 2009, pp. 2.

Hungria, Anderson, "Build for Today. Expand on Demand", Retrieved at << http://www.youpowerthrough.com/pdf/Modularity-AndersonHungaria.pdf >>, Nov. 2008, pp. 15.

"Next Generation Data Center Infrastructure", Feb. 21, 2010, Retrieved at << http://www.sgi.com/pdfs/4172.pdf >>, Pages 12.

"SHIP: Scalable Hierarchical Power Control for Large-Scale Data Centers", Retrieved at << http://ieeexplore.ieee.org/stamp/stamp.jsp?tp=&arnumber=5260553 >>, 18th International Conference on Parallel Architectures and Compilation Techniques, 2009. 10 Pages.

Rasmussen, Neil., "Power and Cooling Capacity Management for Data Centers", Retrieved at << http://www.apcmedia.com/salestools/NRAN-6C25XM_R0_EN.pdf >>, 2007, pp. 18.

"End-to-End Embedded Power Solutions 2010 Product Selection Guide", *Lineage Power*, (2010),32 pages.

"Lineage Power Data Center", Retrieved from: <http://www.lineagepower.com/?page_id=275> on Dec. 9, 2010, (2010),2 pages.

"Battery Management Solutions: High Performance Analog ICs", *Linear Technology Corporation*, Available at <http://www.linear.com/pc/downloadDocument.do?id=10777>,(2010),32 pages.

"Lineage Power Energy Systems", Retrieved from: <http://www.lineagepower.com/?page_id=285> on Dec. 9, 2010, (2010),5 pages.

"Non-Final Office Action", U.S. Appl. No. 12/786,800, (Oct. 30, 2012), 13 pages.

"Notice of Allowance", U.S. Appl. No. 12/797,497, (Dec. 3, 2012), 12 pages.

"Corrected Notice of Allowance", U.S. Appl. No. 12/797,497 (Jan. 28, 2013), 2 pages.

"Final Office Action", U.S. Appl. No. 12/786,800, (Apr. 9, 2013), 16 pages.

"Non-Final Office Action", U.S. Appl. No. 12/912,696, (Apr. 26, 2013), 9 pages.

\* cited by examiner

HIERARCHICAL POWER SMOOTHING

BACKGROUND

Situations arise where it is desirable to have multiple computers operating together at a particular location to provide a service, such as data centers or server farms providing services over the Internet. The computers at those locations, however, do not always consume a constant amount of power. Rather, the computers oftentimes experience temporary peaks in their power usage. Having a large enough power supply at these locations to ensure there is sufficient power for the computers during such peaks in power usage can be problematic because it can be expensive to have the power available to provide to the computers during such peaks even though the peaks are only temporary.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a hierarchical power smoothing environment in a system has multiple tiers and power smoothing components in each of the multiple tiers. Power is provided to one or more devices in a system from a first power smoothing component in a first of the multiple tiers in response to a peak in power usage by the one or more devices. Additionally, power is provided to the one or more devices from a second power smoothing component in a second tier of the multiple tiers if the first power smoothing component is unable to provide sufficient power for the peak in power usage. If the first and second power smoothing components are unable to provide sufficient power for the peak in power usage, then performance of at least one of the one or more devices is reduced in response to the peak in power usage.

BRIEF DESCRIPTION OF THE DRAWINGS

The same numbers are used throughout the drawings to reference like features.

DETAILED DESCRIPTION

Hierarchical power smoothing is discussed herein. In a system including one or more devices, multiple power smoothing components are implemented at different hierarchical tiers. In the event of a peak in power usage by the one or more devices, the power smoothing components at one or more tiers attempt to provide sufficient power for the peak in power usage. Different types of power smoothing components are used at different tiers, with the power smoothing components at lower tiers typically responding faster (and typically providing power for shorter durations) than components at higher tiers. At a highest tier, if power smoothing components at the lower tiers are not able to provide sufficient power for the peak in power usage, then performance of the one or more devices is reduced (e.g., devices are throttled).

Figure 1:
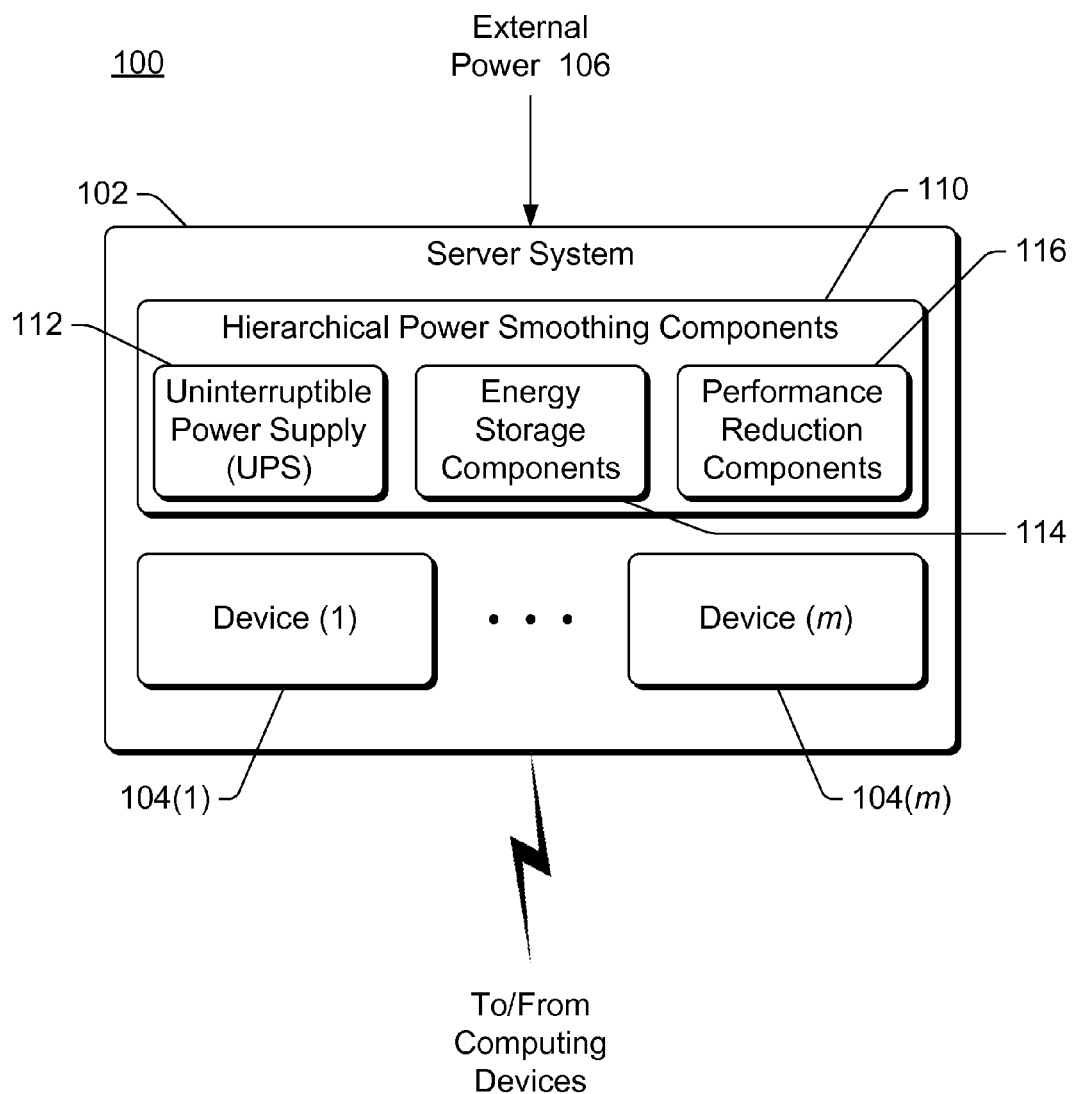
FIG. 1 illustrates an example system implementing the hierarchical power smoothing in accordance with one or more embodiments.

FIG. 1 illustrates an example system 100 implementing the hierarchical power smoothing in accordance with one or more embodiments. System 100 includes a server system 102 that operates to provide one or more services to various computing devices. These computing devices can be located in close physical proximity to server system 102, and/or located across a wide geographic range (e.g., throughout a country or throughout the world). Server system 102 can communicate with such computing devices via a variety of different networks, including the Internet, a local area network (LAN), a cellular or other phone network, an intranet, other public and/or proprietary networks, combinations thereof, and so forth. Server system 102 can be accessed by a variety of different types of computing devices, such as a desktop computer, a laptop or netbook computer, a tablet or notepad computer, a mobile station, an entertainment appliance, a television, a set-top box communicatively coupled to a display device, a cellular or other wireless phone, a game console, an automotive computer, and so forth.

Server system 102 can provide one or more of a variety of different services to computing devices. For example, server system 102 can provide one or more of a social networking service, an email service, a search service, an information resource/storage service, a messaging service, an image and/or video sharing service, a gaming or other entertainment service, and so forth. The one or more services provided by server system 102 can be publicly available or alternatively access to one or more of the services can be restricted to particular users (e.g., those having a valid account as verified by a service of server system 102).

Server system 102 includes multiple (m) devices 104(1), . . . , 104(m) that operate to provide the functionality of the one or more services provided by server system 102. Devices 104 typically include one or more server computers, such as rack servers or blade servers, and system 102 is thus also referred to as a server system. Alternatively, a variety of other types of devices or components can be included as devices 104, such as other types of computing devices, networking components (e.g., a gateway, a router, a switch, etc.), data storage components (e.g., one or more magnetic disk drives), cooling components (e.g., a fan), and so forth.

In one or more embodiments, devices 104 are located within racks of server system 102. A rack is a physical structure or housing into which multiple chassis can be inserted, mounted, or otherwise placed. Alternatively, devices 104 can be grouped into other containers, mounting units, or other grouping configurations. For example, devices 104 can be housed independently (e.g., not within a rack) and communicate with one another via a network or other communication link. Server system 102 can thus range from, for example, a large data center or server farm including thousands of servers housed in numerous racks providing services over the Internet, to a few server computers in their own individual housings providing services over a LAN to a small company.

Server system 102 receives external power 106. External power 106 can be received from one or more conventional external power sources, such as a power station managed by a power utility company. External power 106 can also be received from a backup power generator that operates as a backup source of power in the event of an interruption in power from another source (such as a power utility company). Such a backup generator can be, for example, a diesel-powered or gas-powered generator, a fuel cell based generator, and so forth. External power 106 can be AC power that is converted to DC power by server system 102 and/or can be DC power (that may or may not be converted to different voltage levels by server system 102).

Situations can also arise where there is a peak in power usage of one or more devices 104. A peak in power usage refers to the situation where the amount of power being consumed by one or more devices meets (e.g., is equal to or greater than) a threshold amount. This threshold amount can be set by, for example, a designer or administrator of server system 102. This threshold amount can be based on, for example, an average amount of power the one or more devices consume (e.g., averaged over some period of time, such as minutes, hours, days, etc.).

Server system 102 includes hierarchical power smoothing components 110. Hierarchical power smoothing components 110 include multiple components that operate to provide power to one or more devices 104 during peaks in power usage. This power is in addition to external power 106. Hierarchical power smoothing components 110 include components at multiple different tiers, as discussed in more detail below.

Hierarchical power smoothing components 110 include one or more uninterruptible power supplies (UPS's) 112, one or more other energy storage components 114, and one or more performance reduction components 116. Alternatively, other power smoothing components can be included in components 110 in addition to and/or in place of one or more of a UPS 112, energy storage component 114, and performance reduction component 116.

Each UPS 112 includes one or more batteries, and thus is also an energy storage component. These batteries can be a variety of different types of batteries, such as sealed lead-acid batteries, lithium ion batteries, and so forth. Energy storage components 114 are other types of energy storage components other than batteries of a UPS, such as one or more capacitors. Energy storage components 114 can also generate energy, such as one or more backup generators. Performance reduction components 116 reduce the performance of one or more devices 104, such as by using throttling. Throttling reduces the performance of a device 104 and thus at the same time reduces power consumption of the device 104. Performance reduction component 116 sends a signal or request to one or more of the devices 104 indicating that the one or more devices are to throttle their performance. These devices are configured in different manners to reduce or throttle their performance, such as by reducing power to a component (e.g., a processor), shutting down a component (e.g., shutting down one of multiple processor cores), slowing down operation of a component (e.g., reducing the clock speed of a processor or the rotational speed of a disk drive), and so forth.

One or more of hierarchical power smoothing components 110 can also be used for other operations within server system 102 in addition to power smoothing. For example, UPS 112 detects interruptions in external power 106 and provides power (DC power or AC power) to devices 104 if there is an interruption in external power 106. UPS 112 can, for example, provide power to devices 104 during a time period between the interruption in power from another source (such as a power utility company) and a backup generator generating sufficient AC power to power server system 102. UPS 112 can also provide power to devices 104 in situations where there is no backup generator for server system 102. By way of another example, performance reduction components 116 can be used to reduce the performance of one or more devices 104 in response to other events, such as in response to a desire to reduce power consumption in system 102.

Different ones of hierarchical power smoothing components 110 can also be physically located in different areas of server system 102. For example, a UPS 112 can be a single full server system UPS in its own housing that is located in a same room (or same building) as devices 104 and that provides power to all devices in server system 102, to multiple device level UPS's that are each located within a device 104 and each provide power to a single device 104. UPS's 112 can also be located in multiple areas, such as a server system level UPS in a separate room from devices 104 that provides power to multiple racks of devices 104, a rack level UPS that is included in the same rack as some devices 104 and provides power to devices 104 in that same rack, a device level UPS that is included in a device 104 and provides power to that device 104, combinations thereof, and so forth. By way of another example, energy storage components 114 (such as capacitors) can be included in a particular rack with some devices 104, can be included within devices 104, and so forth.

Additionally, although illustrated as being part of server system 102, one or more hierarchical power smoothing components 110 can be implemented external to server system 102. For example, a UPS 112 can be implemented external to server system 102, a power generator can be implemented external to server system 102, and so forth.

In one or more embodiments, the different energy storage components (UPS 112 and other energy storage component 114) are configured to respond to peaks in power usage by providing power to one or more devices 104 during peaks in power usage. Different technologies are used to implement the different types of components, and these different technologies respond (by providing power during a peak in power usage) at different rates. Components at lower tiers of the hierarchical power smoothing components 110 respond faster (but typically provide power for shorter durations) than components at higher tiers of the hierarchical power smoothing components 110. For example, components at a lowest tier of hierarchical power smoothing components 110 can be capacitors that respond very quickly to a peak in power usage, while a higher tier of hierarchical power smoothing components 110 can be batteries that respond more slowly to the peak in power usage.

The physical location of particular hierarchical power smoothing components 110 in server system 102 varies based at least in part on the particular types of components 110 and the particular technology used to implement those different types of components 110. Components that are physically located closer to devices 104 in system 102 are components that can respond to and provide power during peaks in power usage faster than components that are physically located further from devices 104. These faster responding components also typically (but not necessarily) are able to provide power during peaks for shorter durations than components that are slower in responding to and providing power during peaks in power usage.

Additionally, it should be noted that the discussions herein refer to peaks in power usage, which can also be referred to as spikes up in power. The hierarchical power smoothing discussed herein can analogously be used to provide power during a spike down in power or power loss. Thus, a spike down in power or power loss can analogously be detected, and power can be provided by hierarchical power smoothing components 110 during the spike down in power or power loss analogously to providing power during a spike up in power.

A spike down in power or power loss can also be detected in a higher tier of hierarchical power smoothing components, and an indication of the spike down in power or power loss can be communicated to lower tiers of the hierarchical power smoothing components. This can result in reducing the ability of one or more components of the hierarchical power smoothing components to provide sufficient power for a peak in power usage as discussed below (e.g., the spike down in power or power loss can lead to peaks in power usage that are larger and/or longer in duration).

Figure 2:
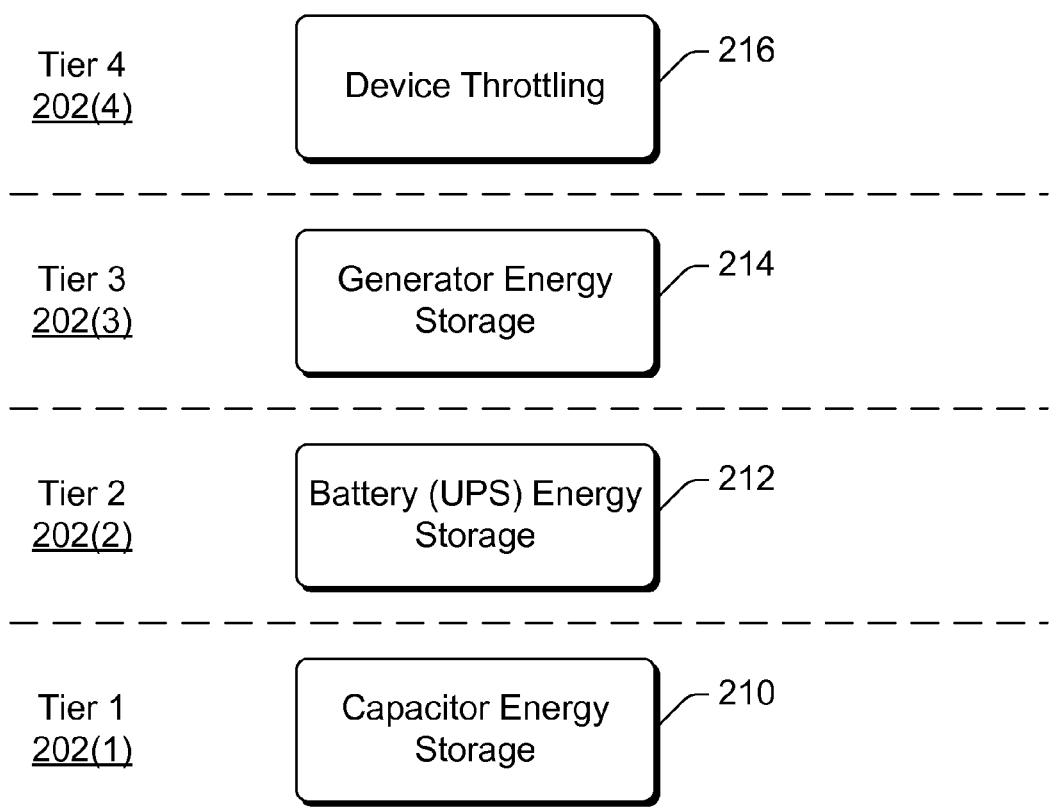
FIG. 2 illustrates an example hierarchical power smoothing environment including multiple tiers in accordance with one or more embodiments.

FIG. 2 illustrates an example hierarchical power smoothing environment 200 including multiple tiers in accordance with one or more embodiments. Hierarchical power smoothing environment 200 is implemented using, for example, hierarchical power smoothing components 110 of FIG. 1. Hierarchical power smoothing environment 200 can be implemented in software, firmware, hardware, or combinations thereof. Hierarchical power smoothing environment 200 is an example, and other environments can use different components.

Hierarchical power smoothing environment 200 provides power to particular devices during peaks in power usage. Accordingly, different hierarchical power smoothing environments 200 can be used for different sets of devices in a server system (e.g., in server system 102 of FIG. 1).

Hierarchical power smoothing environment 200 includes four tiers 202(1), 202(2), 202(3), and 202(4). Tiers 202 are ordered in the hierarchy from a lowest tier (tier 202(1)) to a highest tier (tier 202(4)). Each tier 202 includes a different type of power smoothing component.

In the lowest tier, tier 202(1), one or more capacitors 210 are included as energy storage components. These capacitors 210 are located physically close to the devices to which hierarchical power smoothing environment 200 provides power. For example, capacitors 210 can be located in the devices to which hierarchical power smoothing environment 200 provides power, or in the same racks as the devices to which hierarchical power smoothing environment 200 provides power. Capacitors 210 respond quickly to peaks in power usage, providing power to the devices during such peaks in power usage faster than components in higher tiers (tiers 202(2), 202(3), and 202(4)).

In the next higher tier, tier 202(2), one or more batteries 212 of a UPS are included as energy storage components. These batteries 212 are typically located physically close to the devices to which hierarchical power smoothing environment 200 provides power, but may not be as close as capacitors 210. Batteries 212 can be, for example, in the devices to which hierarchical power smoothing environment 200 provides power, in the same rack as the devices to which hierarchical power smoothing environment 200 provides power, or alternatively elsewhere in the server system. Batteries 212 are slower in responding to peaks in power usage than capacitors 210, but also typically are able to provide power for longer peaks in power usage than capacitors 210 can provide power. Batteries 212 are also able to respond to peaks in power usage, providing power to the devices during such peaks in power usage faster than components in higher tiers (tiers 202(3) and 202(4)).

In the next higher tier, tier 202(3), a generator 214 is included as an energy storage component. Generator 214 is typically physically located further from the devices than capacitors 210 and batteries 212. For example, generator 214 may be located in a different room of the same building as the devices to which hierarchical power smoothing environment 200 provides power, or in a different building. Generator 214 is slower in responding to peaks in power usage than capacitors 210 and batteries 212, but is also typically able to provide power for longer peaks in power usage than capacitors 210 or batteries 212 can provide power.

In the highest tier, tier 202(4), device throttling 216 is included as a power smoothing component. In tier 202(4), a signal or request is sent to one or more of the devices indicating that the one or more devices are to throttle their performance, thereby reducing the power usage of such devices. Device throttling 216 is the highest tier, and thus is used after the energy storage components in the lower tiers (tiers 202(1), 202(2), and 202(3)) are no longer able to provide sufficient power for a peak in power usage. Energy storage components in the lower tiers may be no longer able to provide sufficient power for a peak in power usage because, for example, the charge in the energy storage components has been depleted, the peak is greater than an amount of power that the energy storage components can provide, and so forth. Device throttling 216 can be used indefinitely.

In the example of FIG. 2, capacitor energy storage 210, battery energy storage 212, and generator energy storage 214 are illustrated. More generally, capacitor energy storage 210 can be any of a variety of energy storage components that provide a very small amount of energy for a very short amount of time (e.g., less than 200 Watts for less than one second), battery energy storage 212 can be any of a variety of energy storage components that provide a small amount of energy for a small amount of time (e.g., less than 200 Megawatts for less than 10 minutes), and generator energy storage 214 can be any of a variety of energy storage components that provide a large amount of energy for a large amount of time (e.g., less than 30 Megawatts for a number of days (e.g., as long as there is fuel for the generator)). Battery energy storage 212 provides more energy and/or energy for a longer amount of time than capacitor energy storage 210, and generator energy storage 214 provides more energy and/or energy for a longer amount of time than battery energy storage 212.

Thus, in hierarchical power smoothing environment 200, fast responding power smoothing components are located at lower tiers and physically closer to the devices to which hierarchical power smoothing environment 200 provides power. The fast responding power smoothing components are thus able to quickly provide power to devices in the event of a peak in power usage. Slower responding power smoothing components are located at higher tiers and physically further from the devices to which hierarchical power smoothing environment 200 provides power. However, such slower responding power smoothing components can typically provide power for longer peaks in power usage than the faster responding power smoothing components. The slower responding power smoothing components are thus able to provide power for a longer duration in the event of a peak in power usage (e.g., continuing to provide power for the peak in power usage after the charge in power smoothing components of lower tiers has been depleted).

Figure 3:
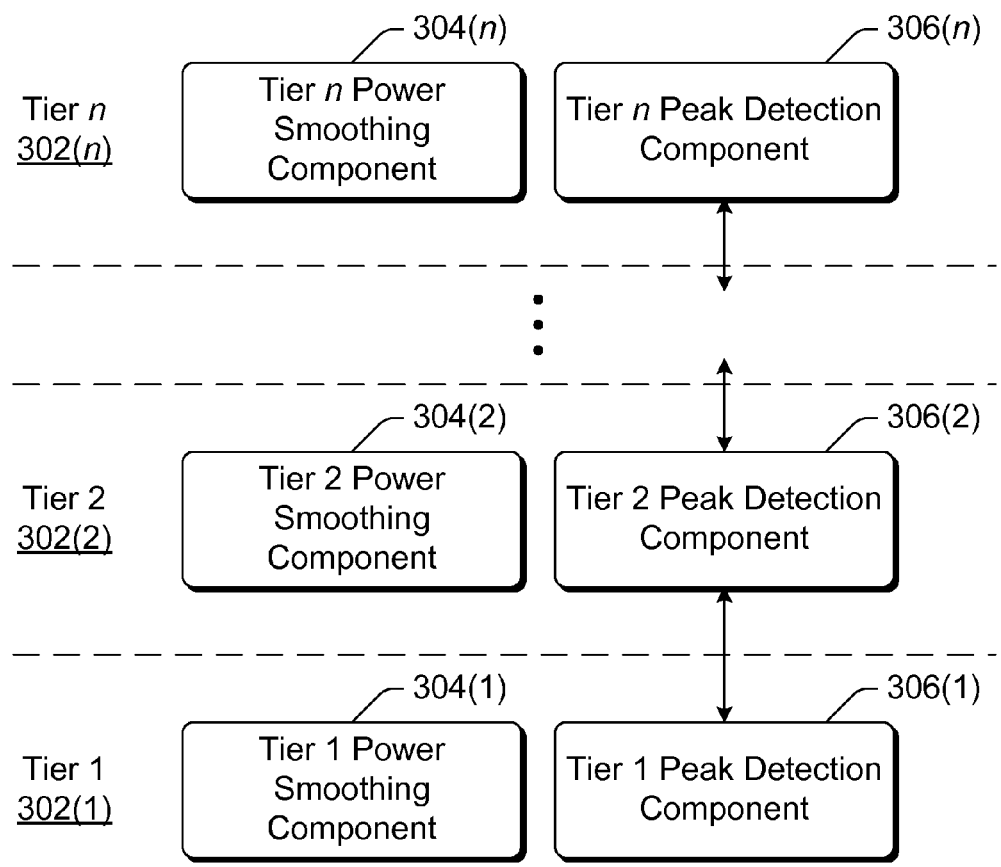
FIG. 3 illustrates another example hierarchical power smoothing environment including multiple tiers in accordance with one or more embodiments.

FIG. 3 illustrates another example hierarchical power smoothing environment 300 including multiple tiers in accordance with one or more embodiments. Hierarchical power smoothing environment 300 is implemented using, for example, hierarchical power smoothing components 110 of FIG. 1. Hierarchical power smoothing environment 300 can be implemented in software, firmware, hardware, or combinations thereof. Hierarchical power smoothing environment 300 is a general example of a hierarchical power smoothing environment, and environment 300 can be hierarchical power smoothing environment 200 of FIG. 2.

Hierarchical power smoothing environment 300 includes multiple (n) tiers 302(1), 302(2), . . . , 302(n). Tiers 302 are ordered in the hierarchy from a lowest tier (tier 302(1)) to a highest tier (tier 302(n)). For example, tier 302(2) is a next higher tier from tier 302(1), and tier 302(n−1) is a next lower tier from tier 302(n).

Each tier 302 includes a power smoothing component 304 and a peak detection component 306. Alternatively, the same one or more peak detection components 306 can be used by multiple tiers 302. The power smoothing components 304 at different tiers 302 are typically different types of power smoothing components. Different technologies are used to implement the different types of components in the different tiers 302. As discussed above, these different technologies are configured to respond to (provide peak power during) peaks in power usage. Power smoothing components at a lower tier of hierarchical power smoothing environment 300 respond faster (but typically provide power for shorter durations) than components at higher tiers of hierarchical power smoothing environment. For example, components at a tier 302(x), where x≦n, typically respond faster but provide power for a shorter duration than components at tier 302(x+1), and respond slower but provide power for a longer duration than components at tier 302(x−1).

The number of tiers 302, as well as the particular types of components in the different tiers 302, is selected by an administrator and/or customers of the server system implementing hierarchical power smoothing environment 300 to provide the power smoothing desired by the administrator and/or customers. Additionally, the time taken by a power smoothing component 304 in one tier to respond to a peak in power usage can be used by the administrator and/or customers as a basis for determining a number and/or capacity of power smoothing components 304 to employ in a next lower tier. For example, a number and/or capacity of capacitors to be used in tier 302(1) can be selected based on an amount of time taken by batteries in tier 302(2) to respond to a peak in power usage, so that the capacitors in tier 302(1) provide sufficient power for the peak in power usage until the batteries in tier 302(2) are able to provide power for the peak in power usage.

In each tier 302, a peak in power usage by one or more devices in the server system employing hierarchical power smoothing environment 300 (e.g., server system 102 of FIG. 1) is detected by the peak detection component 306 in that tier. A peak detection component 306 can detect a peak in power usage in a variety of different manners. In one or more embodiments, devices in the server system are powered by one or more power supplies. Each power supply can provide power to one or more devices (e.g., to a single device, to the devices in a rack or other collection of devices, and so forth). A peak in power usage is detected by monitoring one or more of various indicators related to a power supply associated with the one or more devices to determine when peak power usage meets (e.g., equals or exceeds) a threshold value. This threshold value can be, for example, a maximum power capacity of the power supply, a value set at some point below the maximum power capacity of the power supply (e.g., 90% of the maximum power capacity of the power supply), and so forth. If the threshold current power usage by the one or more devices powered by the power supply meets (e.g., equals or exceeds) the threshold value, then the presence of a peak in power usage is detected.

One or more of a variety of indicators can be used to identify the power usage of devices receiving power from the power supply. For example, the input current of AC power to a power supply can be monitored, such as by using a series resistor or inductive loop. By way of another example, the output current of a power supply can be monitored, such as by using a series resistor, inductive loop, or monitoring the voltage drop across an output FET (field-effect transistor). By way of yet another example, the switching frequency of an output rectifier of the power supply can be monitored.

In a server system, one or more power supplies provide power to the devices in the server system, and different server systems can be configured with power supplies in different locations. For example, a particular server system may have a backup generator that provides power to all racks of the server system, and each rack can have one or more power supplies that provide power to one or more devices in that rack. By way of another example, a particular server system may have a backup generator that provides power to all racks of the server system, and each device in each rack can have a power supply that provides power to that device.

Each tier 302 is typically associated with a particular power supply of the server system. A peak in power usage detected by peak detection components 306 in a particular tier 302 is a peak in power usage for the one or more devices that are powered by a particular power supply associated with that tier. In response to a detected peak in power usage, power smoothing component 304 provides power for the peak in power usage to the devices powered by the power supply associated with that tier. For example, tier 302(1) may be associated with a particular rack of the server system and peak detection component 306(1) detects peaks in power usage by the devices (collectively) in that particular rack. In response to a detected peak in power usage, power smoothing component 304(1) provides power to the devices in that particular rack. By way of another example, tier 302(2) may be associated with a backup generator that provides power to multiple racks of the server system and peak detection component 306(2) detects peaks in power usage by the multiple racks (collectively) in the server system. In response to a detected peak in power usage, power smoothing component 304(2) provides power to the devices in those multiple racks.

In response to a peak in power usage being detected by a peak detection component 306 in a particular tier 302, a power smoothing component 304 in that particular tier 302 attempts to provide sufficient power for the peak in power usage. Peak detection component 306 can send a command or signal to the power smoothing component 304 in that particular tier 302 to provide power during the peak, or the power smoothing component 304 can be otherwise configured to automatically provide power during a peak. If the power smoothing component 304 in that particular tier is successful in providing sufficient power for the peak in power usage, then power smoothing components from other tiers 302 need not provide power for the peak in power usage.

However, if the power smoothing component in a particular tier 302 is unable to provide sufficient power for the peak in power usage, then the power smoothing component 304 in that tier (the next higher tier in which the peak in power usage is detected) attempts to provide sufficient power for the peak in power usage. This power can be in addition to or alternatively in place of the power provided by the lower tier.

Whether the power smoothing component in a particular tier is able to provide sufficient power for a peak in power usage can be determined or identified in a variety of different manners. In one or more embodiments, a power smoothing component holds a particular amount of charge or energy. Whether the power smoothing component can provide sufficient power for a peak in power usage is determined based on whether the power smoothing component holds enough charge to provide the peak power to the one or more devices for the duration of the peak. The peak power refers to the power usage of the one or more devices that exceeds a particular power capacity of the power supply providing power to the one or more devices. This particular power capacity can be a maximum power capacity of the power supply, or alternatively another value (e.g., a fraction of the maximum power capacity (e.g., 90% of the maximum power capacity), an amount that is the threshold amount used for determining whether there is a peak in power usage as discussed above, etc.).

Alternatively, whether the power smoothing component can provide sufficient power for a peak in power usage can be determined based on whether the power smoothing component holds enough charge to provide the peak power to the one or more devices for the duration of the peak while still meeting (e.g., staying at or above) a threshold charge level. This threshold charge level can be, for example, an amount of charge that batteries of a UPS are to maintain in order to power the one or more devices for at least a threshold amount of time in the event of an interruption in power from an external power source (e.g., external power 106 of FIG. 1).

In one or more embodiments, power smoothing components 304 and peak detection components 306 in different tiers 302 operate to provide power during a peak in power usage independently of one another. At each tier 302, when the peak detection component 306 detects a peak in power usage, the power smoothing component 304 in that tier responds by providing power for the peak in power usage. With different types of components being used in different tiers as discussed above, this results in the power detection components 306 of multiple tiers detecting the peak in power usage and the power smoothing components 304 in each of those multiple tiers responding to the detection by providing power for the peak in power usage. However, as the different types of components at the different tiers have different response times, lower tiers 302 will provide power for the peak in power usage more quickly than higher tiers.

Alternatively, in one or more embodiments peak detection components 306 can communicate various information or data regarding peaks in power usage with one another. This information or data can include information identifying that a peak in power usage has been detected by a particular peak detection component 306. For example, peak detection component 306(1) can provide an indication to peak detection component 306(2) that component 306(1) has detected a peak in power usage, and this indication can be passed up to the peak detection components 306 at the higher tiers.

This information or data communicated between peak detection components can also include information identifying whether to respond to a peak in power usage. For example, peak detection component 306(n) can provide an indication to peak detection component 306(n-1) to no longer provide power during a peak in power usage because peak detection component 306(n) is now able to provide power for the peak in power usage.

It should also be noted that less than all power smoothing components 304 may provide power during a particular peak in power usage. For example, if a particular peak in power usage is very short and power smoothing component 304(1) has sufficient capacity to provide power for the peak in power usage, then other power smoothing components (e.g., power smoothing components 304(2) ... 304(n)) need not provide power during that peak in power usage. Such other power smoothing components may begin to respond to the peak in power usage, but the peak is over before such other power smoothing components are able to provide power.

The power smoothing component 304(n) in the highest tier in hierarchical power smoothing environment 300 (tier 302(n)) reduces the performance of one or more devices. Power smoothing component 304(n) reduces the performance of the one or more devices by, for example, throttling the devices as discussed above. The one or more devices for which performance is reduced is the one or more devices powered by the particular power supply associated with the highest tier (tier 302(n)). For example, if the power supply associated with the highest tier is a backup generator for the server system, then the performance of one or more devices in the server system is reduced. By way of another example, if the power supply associated with the highest tier is a power supply for a particular rack in the server system, then the performance of one or more devices in that particular rack is reduced.

The power smoothing component 304(n) can reduce the performance of all devices that receive power from the particular power supply associated with the highest tier, or alternatively from one or more select devices (e.g., one or more devices that have the highest peak in power usage, one or more devices that are identified as lower priority devices, and so forth). Additionally, power smoothing component 304(n) can reduce the performance of a particular one or more devices that receive power from the particular power supply associated with the highest tier, while other devices that receive power from the particular power supply associated with the highest tier continue to receive power for the peak in power usage from energy storage components in lower tiers (e.g., one or more power smoothing components in a tier below tier 304(n)).

After a peak in power usage has passed, any power smoothing components 304 that are providing power to the one or more devices cease providing such power. Similarly, any reduction in the performance of the one or more devices is also ceased (e.g., a signal or request is sent to the one or more devices to inform the one or more devices that they no longer need to throttle their performance). The peak detection components 306 detect when there is no longer a peak in power usage, and thus when the power smoothing components 304 can cease providing power to the one or more devices. This ceasing of providing power and reducing performance can be done in accordance with the ordering of the tiers (from highest to lowest tier). For example, as the peak in power usage passes (or the peak declines), any reduction in the performance of the one or more devices is ceased. Then any power supplied by the next lowest tier ceases being supplied, then power supplied by the next lowest tier ceases being supplied, and so forth.

Additionally, after a peak in power usage has passed one or more components that were used to provide power to the one or more devices during the peak in power usage can be recharged. For example, batteries are recharged, capacitors are recharged, and so forth. Additionally, if there is sufficient power available from a power supply, one or more components can be recharged prior to the peak in power usage completely passing.

Although hierarchical power smoothing environment 300 is illustrated as having a separate peak detection component 304 in each tier, alternatively, a single peak detection component 304 can correspond to and be used for multiple (e.g., all) tiers 302 in hierarchical power smoothing environment 300. In such embodiments, the single peak detection component 304 detects peaks in power usage and invokes the power smoothing components of the corresponding multiple tiers 302 to attempt to provide sufficient power for the peak in power usage.

Thus, different energy storage components at different tiers are used to provide power during peaks in power usage. Different technologies are used to implement the different types of energy storage components in the different tiers, with energy storage components at lower tiers responding faster (but typically providing power for shorter durations) than energy storage components at higher tiers. If the energy storage components are not able to provide sufficient power for the peak in power usage, then the performance of the devices is reduced (e.g., using throttling).

Figure 4:
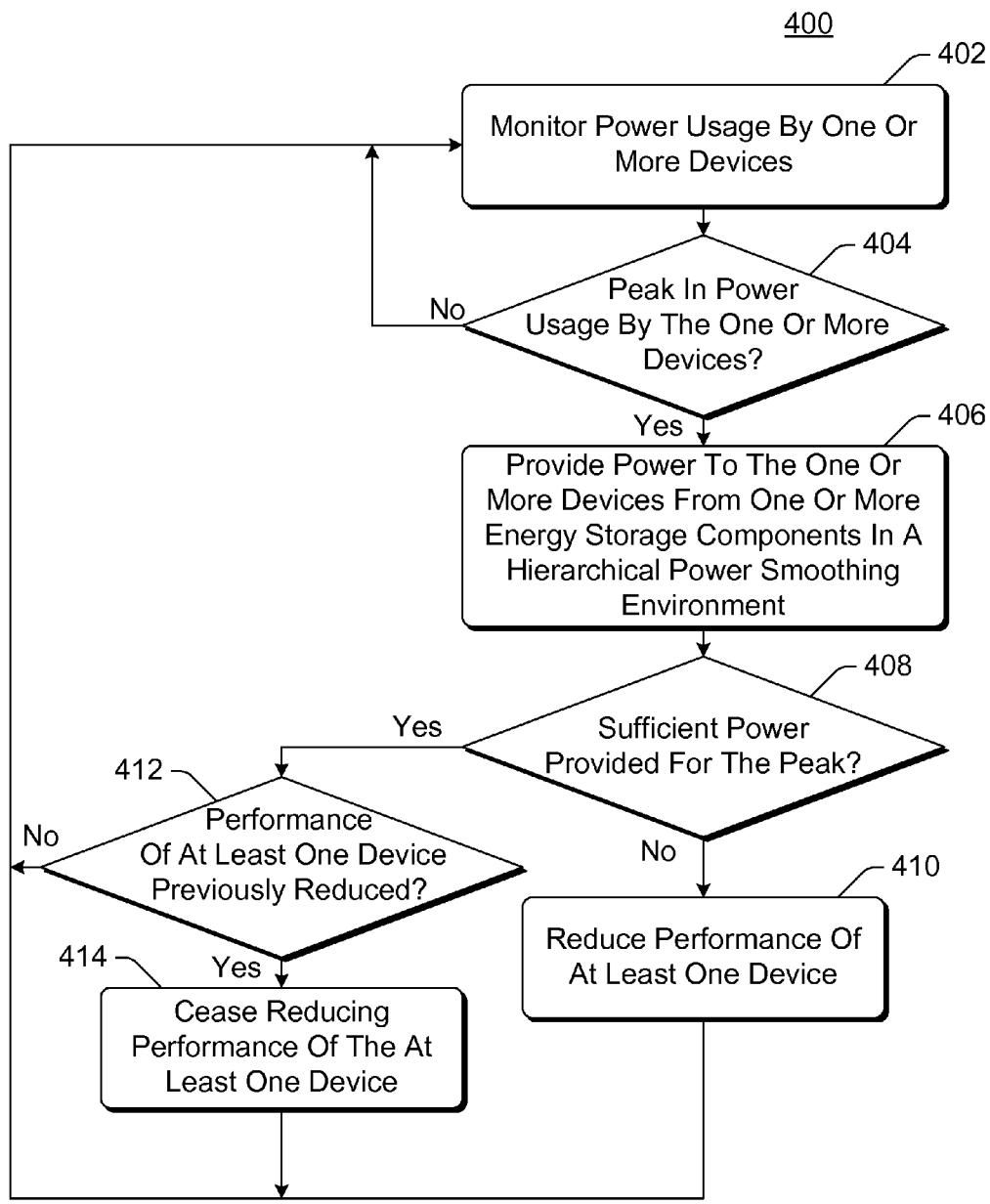
FIG. 4 is a flowchart illustrating an example process for implementing hierarchical power smoothing in accordance with one or more embodiments.

FIG. 4 is a flowchart illustrating an example process 400 for implementing hierarchical power smoothing in accordance with one or more embodiments. Process 400 can be implemented in software, firmware, hardware, or combinations thereof. Process 400 is shown as a set of acts and is not limited to the order shown for performing the operations of the various acts. Process 400 is an example process for implementing hierarchical power smoothing; additional discussions of implementing hierarchical power smoothing are included herein with reference to different figures.

In process 400, power usage by one or more devices is monitored (act 402). These one or more devices can be the devices that are powered by a particular power supply as discussed above. This monitoring can be monitoring of one or more of various indicators related to a power supply as discussed above.

Process 400 proceeds based on whether a peak in power usage by the one or more devices is detected (act 404). If no peak in power usage is detected, then process returns to act 402 where monitoring of the power usage by the one or more devices continues.

However, if a peak in power usage by the one or more devices is detected, then power is provided to the one or more devices from one or more energy storage components in a hierarchical power smoothing environment (act 406). These energy storage components can include different types of energy storage components (e.g., capacitors, batteries, generators, etc.) in different tiers as discussed above.

Process 400 proceeds based on whether the power provided by energy storage components from act 406 is sufficient power for the peak in power usage (act 408). Whether the power provided by these energy storage components is sufficient power for a peak in power usage can be determined or identified in a variety of different manners as discussed above.

If the power provided by the energy storage components from act 406 is not sufficient power for the peak in power usage, then the performance of at least one of the one or more devices is reduced (act 410). The performance of at least one device can be reduced by, for example, throttling the performance of the at least one device. Process 400 then returns to act 402 where monitoring of the power usage by the one or more devices continues.

Returning to act 408, if the power provided by the energy storage devices from act 406 is sufficient power for the peak in power usage, then process 400 proceeds based on whether performance of at least one device was previously reduced (act 412). The performance of at least one device can have been previously reduced in act 410 discussed above.

If the performance of at least one device was not previously reduced, then process 400 then returns to act 402 where monitoring of the power usage by the one or more devices continues. However, if the performance of at least one device was previously reduced, then reducing the performance of the at least one device is ceased (act 414). Process 400 then returns to act 402 where monitoring of the power usage by the one or more devices continues.

Thus, it can be seen that the hierarchical power smoothing techniques discussed herein allow peaks in power usage to be powered by multiple different energy storage components before performance of the one or more devices is reduced. For example, power for short peaks can be provided by capacitors, power for longer peaks can be provided by UPS batteries, and for even longer peaks the performance of the one or more devices is throttled. This allows the one or more devices to be powered by multiple energy storage components before needing to reduce their performance and allows them to keep running at their full or desired performance level for a longer amount of time. Additionally, the one or more devices are allowed to keep running without reducing their performance and without requiring a large amount of extra power capacity to be available in the system solely to provide power during such peaks in power usage.

Additionally, returning to FIG. 1, the particular hierarchical power smoothing components 110 that are included in server system 102 can vary based on the desires of the administrator and/or customers of server system 102. Different customers can select different hierarchical power smoothing components 110, thus incurring the cost for only the power smoothing capability they desire to have. For example, a first set of devices 104 can be owned or leased by a first company (or business unit), while a second set of devices can be owned or leased by a second company (or business unit). The first company may desire to include capacitors, UPS's, and device throttling in hierarchical power smoothing components 110. The second company, however, may desire to include only device throttling in hierarchical power smoothing components 110. Thus, the first company incurs the cost of purchasing and maintaining capacitors, UPS's, and device throttling components, while the second company incurs only the cost of purchasing and maintaining device throttling components.

Figure 5:
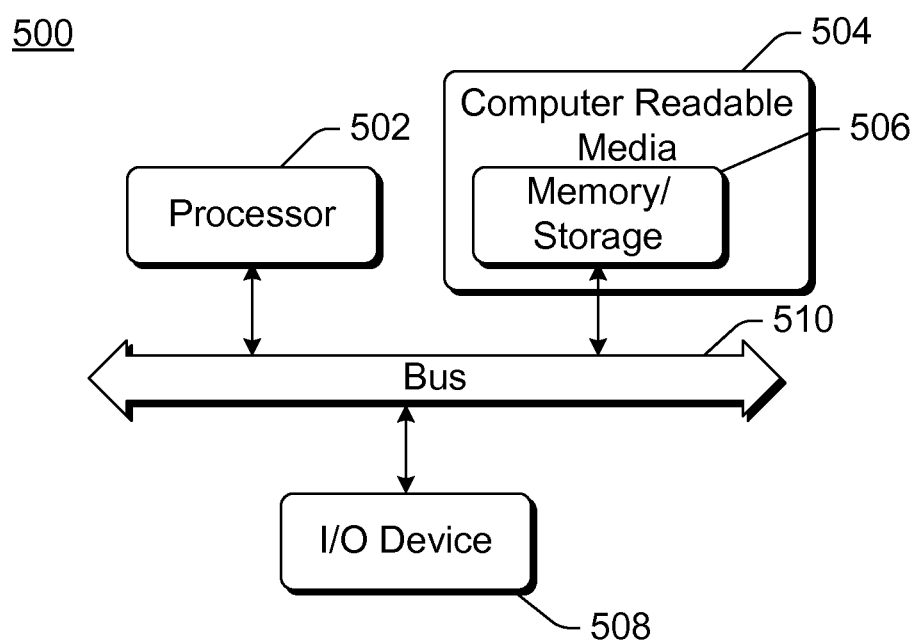
FIG. 5 illustrates an example computing device that can be configured to implement hierarchical power smoothing in accordance with one or more embodiments.

FIG. 5 illustrates an example computing device 500 that can be configured to implement hierarchical power smoothing in accordance with one or more embodiments. Computing device 500 can be, for example, a device or controller for UPS 112 of FIG. 1, or a device or controller implementing hierarchical power smoothing environment 200 of FIG. 2 or hierarchical power smoothing environment 300 of FIG. 3. Computing device 500 can also be a device 104 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the hierarchical power smoothing described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a system, the method comprising:
determining a response time for a first power smoothing component and a second power smoothing component;
assigning the first power smoothing component to a first tier of a hierarchical power smoothing environment having multiple tiers based at least in part on the response time of the first power smoothing component;
assigning the second power smoothing component to a second tier of the hierarchical power smoothing environment based at least in part on the response time of the second power smoothing component;
providing, from the first power smoothing component, power to one or more devices in the system in response to a peak in power usage by the one or more devices;
providing, from the second power smoothing component, power to the one or more devices in response to the peak in power usage if the power smoothing component in the first tier is unable to provide sufficient power for the peak in power usage; and
reducing performance of at least one of the one or more devices in response to the peak in power usage if the first and second power smoothing components are unable to provide sufficient power for the peak in power usage, while continuing to provide power for the one or more devices.

2. A method as recited in claim 1, wherein the first tier comprises one or more energy storage components whose response time is faster than power smoothing components in the other tiers of the multiple tiers.

3. A method as recited in claim 1, wherein the first power smoothing component comprises one or more capacitors.

4. A method as recited in claim 3, wherein the second power smoothing component comprises one or more batteries of one or more uninterruptible power supplies.

5. A method as recited in claim 1, the reducing performance of at least one of the one or more devices comprising sending a signal, to the at least one of the one or more devices, to throttle its performance.

6. A method as recited in claim 1, wherein the first power smoothing component in the first tier is unable to provide sufficient power for the peak in power usage if the first power smoothing component does not hold enough charge to provide peak power to the one or more devices for the duration of the peak, the peak power comprising a power usage of the one or more devices that exceeds a power capacity of a power supply providing power to the one or more devices.

7. A method as recited in claim 6, wherein the power capacity of the power supply comprises a maximum power capacity of the power supply.

8. A method as recited in claim 1, wherein the power smoothing component in the second tier is unable to provide sufficient power for the peak in power usage if the second power smoothing component does not hold enough charge to provide peak power to the one or more devices for the duration of the peak while still meeting a threshold charge level, the peak power comprising a power usage of the one or more devices that exceeds a power capacity of a power supply providing power to the one or more devices.

9. A method as recited in claim 8, wherein the power capacity of the power supply comprises a maximum power capacity of the power supply.

10. A method as recited in claim 1, further comprising ceasing reducing performance of the at least one of the one or more devices after the peak in power usage has passed.

11. A system comprising:
a first power smoothing component in one tier of a hierarchical power smoothing environment having multiple tiers, the first power smoothing component being configured to provide power to one or more devices in the system in response to a peak in power usage by the one or more devices, wherein the first power smoothing component is assigned to the one tier based at least in part on a determined response time of the first power smoothing component;
a second power smoothing component in another tier of the hierarchical power smoothing environment, the second power smoothing component being configured to provide power to the one or more devices in the system in response to a peak in power usage if the first power smoothing component does not provide sufficient power for the peak in power usage, wherein the second power smoothing component is assigned to the another tier based at least in part on a determined response time of the second power smoothing component; and
a third power smoothing component in an additional tier of the hierarchical power smoothing environment, the third power smoothing component configured to reduce performance of at least one of the one or more devices if the first power smoothing component and the second power smoothing component do not provide sufficient power for the peak in power usage, while continuing to provide power for the one or more devices.

12. A system as recited in claim 11, wherein the determined response time of the first power smoothing component is faster than the determined response time of the second power smoothing component and a determined response time of the third power smoothing component.

13. A system as recited in claim 11, wherein the first power smoothing component comprises one or more capacitors in one or more uninterruptible power supplies.

14. A system as recited in claim 13, wherein the second power smoothing component comprises one or more batteries of the one or more uninterruptible power supplies.

15. A system as recited in claim 11, wherein reduction of performance of at least one of the one or more devices results from sending a signal, to the at least one of the one or more devices, to throttle performance of the at least one of the one or more devices.

16. A system as recited in claim 11, wherein the first power smoothing component does not provide sufficient power for the peak in power usage if the first power smoothing component does not hold enough charge to provide peak power to the one or more devices for the duration of the peak, the peak power comprising a power usage of the one or more devices that exceeds a power capacity of a power supply providing power to the one or more devices.

17. A system as recited in claim 11, wherein the second power smoothing component does not provide sufficient power for the peak in power usage if the second power smoothing component does not hold enough charge to provide peak power to the one or more devices for the duration of the peak while still meeting a threshold charge level, the peak power comprising a power usage of the one or more devices that exceeds a maximum power capacity of a power supply providing power to the one or more devices.

18. A system as recited in claim 17, wherein the second power smoothing component comprises one or more batteries of an uninterruptible power supply, and wherein the threshold charge level comprises an amount of charge that the one or more batteries are to maintain in order to power the one or more devices for at least a threshold amount of time in the event of an interruption in power from an external power source.

19. A system as recited in claim 11, wherein the third power smoothing component is further to cease reducing performance of the at least one of the one or more devices after the peak in power usage has passed.

20. A method in a system having a power supply that provides power to one or more devices and that uses a hierarchical power smoothing environment having multiple tiers, the method comprising:
determining a response time for a first power smoothing component and a second power smoothing component;
assigning the first power smoothing component to a first tier of the multiple tiers based at least in part on the response time of the first power smoothing component;
assigning the second power smoothing component to a second tier of the multiple tiers based at least in part on the response time of the second power smoothing component;
providing, from the first power smoothing component, power to the one or more devices in response to a peak in power usage by the one or more devices, the first power smoothing component comprising one or more capacitors;
providing, from the second power smoothing component, power to the one or more devices in response to the peak in power usage if the first power smoothing component does not provide sufficient power for the peak in power usage, the second power smoothing component comprising one or more batteries of an uninterruptible power supply; and
reducing performance of at least one of the one or more devices in response to the peak in power usage, while continuing to provide power for the one or more devices, if the first and second power smoothing components are unable to provide sufficient power for the peak in power usage, wherein the first and second power smoothing components are unable to provide sufficient power for the peak in power usage when the one or more capacitors do not hold enough charge to provide peak power to the one or more devices for the duration of the peak and the one or more batteries do not hold enough charge to provide peak power to the one or more devices for the duration of the peak while still meeting a threshold charge level, wherein the threshold charge level comprises an amount of charge that the one or more batteries are to maintain in order to power the one or more devices for at least a threshold amount of time in the event of an interruption in power from an external power source.

* * * * *